United States Patent
Pero

[11] B 3,921,673
[45] Nov. 25, 1975

[54] PROTECTIVE INSERT FOR LINED FLANGED CONDUIT

[75] Inventor: Richard E. Pero, Essexville, Mich.

[73] Assignee: The Dow Chemical Company, Midland, Mich.

[22] Filed: May 29, 1973

[21] Appl. No.: 364,786

[44] Published under the Trial Voluntary Protest Program on January 28, 1975 as document no. B 364,786.

[52] U.S. Cl. ................ 138/109; 138/110; 285/55
[51] Int. Cl.² .................... F16L 9/18; F16L 57/00
[58] Field of Search ........... 138/109, 96 R, 110, 145; 285/55; 220/39 R; 277/216; 29/157

[56] References Cited
UNITED STATES PATENTS

| | | | |
|---|---|---|---|
| 2,451,599 | 10/1948 | Wittse | 220/39 R |
| 2,982,311 | 5/1961 | Haskell | 138/109 X |
| 3,298,716 | 1/1967 | Taylor | 285/55 |
| 3,383,750 | 5/1968 | Schroeder et al. | 29/159 R |
| 3,435,853 | 4/1969 | Weeder et al. | 138/147 |
| 3,453,008 | 7/1969 | Lejeune | 138/109 X |
| 3,459,619 | 8/1969 | Maxwell | 138/96 X |

Primary Examiner—Richard C. Queisser
Assistant Examiner—Daniel M. Yasich
Attorney, Agent, or Firm—Robert B. Ingraham

[57] ABSTRACT

A substantial increase in life in flanged plastic lined conduit is obtained when an annular insert is employed at the juncture of the flange and the conduit, the annular insert having a generally inwardly facing curved surface and the plastic liner subsequently flanged over the curved insert.

4 Claims, 2 Drawing Figures

PROTECTIVE INSERT FOR LINED FLANGED CONDUIT

Corrosion resistant piping has found wide use particularly in industry. Glass, stainless steel, ceramic and similar piping is used satisfactorily in many applications. However, for many purposes it is eminently satisfactory to apply a thermoplastic lining to a conduit such as a low carbon steel pipe. In many applications lengths of such pipe are connected by means of flanged connections. Such flanged connections are often prepared by removing a portion of the metal conduit, threading the metal conduit, applying a flange to the conduit most often by threading the external surface of the conduit and providing a flange having mating threads therein. Subsequently, the protruding portion of the thermoplastic liner which is left after a portion of the outer casing has been removed is flanged to provide a liner flange radially inwardly extending along the flange which has been applied to the outer or metal casing. Such flanging of lined pipe is well known in the art and methods are set forth in U.S. Pat. Nos. 3,335,484; 3,383,750; 3,390,442 and 3,461,505, the teachings of which are herewith incorporated by reference thereto. It is desirable to employ a flange which has a straight-through threaded opening beveled or unbeveled and no shoulder which engages the terminal end of the metal casing. Employing the straight-through threads, substantially greater latitude is obtained in bolt hole alignment and aids considerably in assembly of lined piping systems. Lined piping or conduits prepared in the aforementioned manner with a metal flange with the straight-through threads; that is, with flanges without a shoulder which engages the end of the conduit, have on occasion been subject to liner failure in the region of the flange. Such failure usually occurs after repeated temperature cycling; that is, heating of the liner from ambient temperatures to an operating temperature and back to ambient temperature. Such failure on temperature cycling is of little significance if the piping is employed in a continuous process where such cycling does not occur. However, where a process is of an intermittent nature, such failure can be and often is a serious problem.

It would be desirable if there were available an improved flanged lined conduit resistant to failure in the region of the flange.

It would also be desirable if there were an improved method for the preparation of temperature cycling-resistant thermoplastic lined conduit.

It would further be desirable if there were available an improved lined conduit method and construction which resisted failure on temperature cycling and which was readily and simply fabricated.

These benefits and other advantages in accordance with the present invention are achieved in a lined conduit, the lined conduit comprising a rigid outer casing, the outer casing having at least one end, a flange disposed on and affixed to said end, the conduit having a synthetic resinous thermoplastic liner, the liner adjacent said end forming a generally radially extending flange disposed generally adjacent to the conduit flange, the improvement which comprises an annular insert disposed at the junction of the flange and the casing, the annular insert having a curved surface which provides a generally smooth transition between the inner surface of the conduit casing and the flange disposed on said casing, the curved surface of said insert being disposed toward said liner.

Also contemplated within the scope of the present invention is a method for the preparation of synthetic resinous thermoplastic lined conduit, the steps of the method comprising providing a conduit having a rigid outer casing and an internal synthetic resinous liner, the conduit having at least one end, removing a portion of the outer casing adjacent one end to provide a protruding liner portion, applying a flange to the rigid outer casing on said end defining the protruding portion of said synthetic resinous thermoplastic liner in a generally radially outward direction to form a liner flange generally parallel to the flange applied to said casing, the improvement which comprises applying an annular insert having at least one compound curved surface at a location generally at the junction of the casing flange and the casing, the curved surface forming a generally smooth transition from the internal surface of the conduit to the surface of the casing flange, the curved surface of the insert being disposed immediately adjacent the synthetic resinous liner portion.

Further features and advantages of the present invention will become more apparent from the following specification taken in connection with the drawing wherein.

Figure 1:
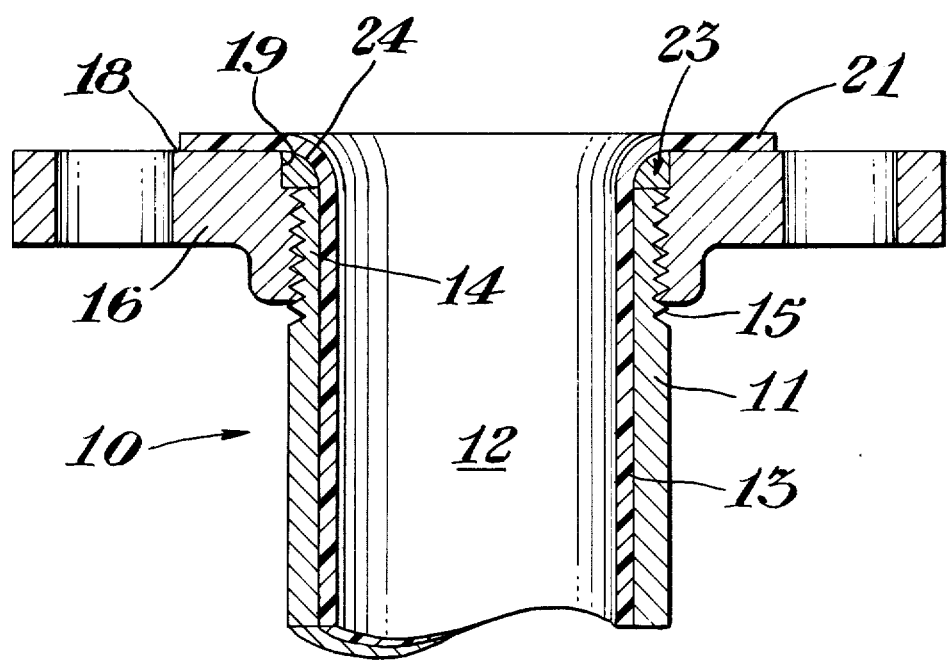
FIG. 1 is a sectional view of a conduit in accordance with the present invention.

In FIG. 1 there is depicted a sectional view of a flanged conduit generally designated by the reference numeral 10. The conduit 10 comprises in cooperative combination a rigid metallic exterior casing 11. The casing 11 defines therein a passage 12 extending the entire length thereof. Disposed within the passage 12 is a tubular synthetic resinous or plastic liner 13. The conduit 10 has at least one end 14. The exterior surface of the end 14 defines a plurality of external threads 15. A flange 16 is threadably engaged with the threads 15. The flange 16 defines a generally radially extending surface 18 remote from the outer casing 11. The flange 16 at a location generally remote from the conduit 11 and adjacent the face 18 defines a generally annular groove 19. The annular groove 19 is outwardly facing and immediately adjacent the face 18. The liner 13 adjacent the end 14 of the conduit 10 is radially outwardly deformed to form a liner flange 21. Within the groove or recess 19 is disposed an annular insert 23. The insert 23 has a doubly or compound curved surface 24 which serves to form a generally smooth transition surface between the face 18 of the flange 16 and the inner cylindrical surface of the conduit 11.

Figure 2:
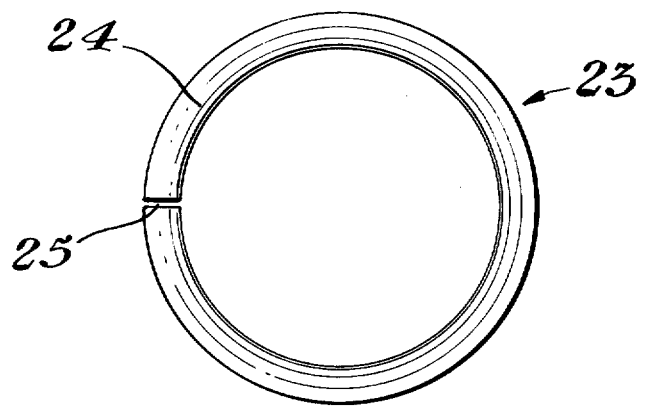
FIG. 2 is a view of an insert employed in the conduit of FIG. 1.

In FIG. 2 there is depicted a face view of the insert 23 of FIG. 1 showing the compound curved surface 24. As depicted in FIG. 2, beneficially the insert 23 is radially split at a location designated by the reference numeral 25.

In preparing conduit such as is depicted in FIG. 1, a standard pipe flange is recessed to form an annular groove such as the groove 19. A portion of the casing 11 is removed to provide a protruding portion of liner, the external threads 15 are formed upon the casing 11, flange applied and an insert ring such as the ring 23 is placed over the protruding portion of the liner and the protruding portion of the liner flanged in any conventional manner well known in the art.

Beneficially, the insert such as the insert 23 may be a split ring such as depicted in FIG. 2 or a solid ring without the split. If a rigid ring is employed and the liner has a tendency to expand, some difficulty can be encountered when applying the ring. Therefore, it is usually desirable to employ a split ring which may be opened sufficiently to permit the split ring to be placed over the protruding portion of the liner, or alternately, a resilient ring or insert may be utilized such as one prepared from organoplastic material such as rubber or plastics. The material from which the ring is prepared generally is not critical. Metal, plastics, molded fiber are all eminently satisfactory. Generally it is undesirable to employ foamed thermoplastics as a ring in pipe systems which will be subject to extended periods of high temperature and pressure as foamed thermoplastic rings over extended periods of time may cold flow and collapse. However, such rings are satisfactory for low temperature and low pressure applications. When the material of the ring is a rigid material such as metal, the surface of the ring or insert adjacent the pipe and flange need not be entirely in contact therewith. However, if soft materials which will deform under operating pressures and temperatures are employed, the insert should conform to the adjacent pipe and flange surfaces.

By way of further illustration, a pipe section is prepared having a fluorinated ethylene/-propylene lining and employing a steel insert ring such as depicted in FIG. 2 wherein the curved surface 23 has a radius of about 3/16 inch. The pipe section is subjected to temperature cycling by heating to 275°F. for a period of one hour and cooling to −20°F. for about an hour. The pipe is subjected to 100 such temperature cycles. On removal of the pipe section from the temperature cycling apparatus, the liner is still intact. By way of comparison, a number of pipe sections are prepared in the conventional manner; that is, employing a flange generally as depicted in FIG. 1 but without the groove 19 and without the insert ring 23. Failure of the liner is observed after 1 to 6 temperature cycles. Generally the radius of the surface 24 of the insert 23 is not critical but desirably is at least one quarter the thickness of the lining and advantageously from about 1 to 3 times the thickness of the thermoplastic lining. As the radius decreases, there is increased probability of failure on temperature cycling, and as the radius is increased the size of the insert ring becomes inconvenient.

Using inserts in accordance with the present invention is eminently successful with all thermoplastic lined pipe.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a lined conduit, the lined conduit comprising a rigid outer casing, the outer casing having at least one end, a conduit flange disposed on and affixed to said end, the conduit having a synthetic resinous thermoplastic liner, the liner adjacent said end additionally forming a generally radially extending liner flange disposed generally adjacent to the conduit flange, the improvement which comprises an annular inwardly facing groove defined by the junction of the conduit and the conduit flange has an annular insert disposed within the groove, the annular insert having a generally outwardly facing curved surface which provides a generally smooth transition surface between the inner surface of the conduit casing and the conduit flange disposed on said casing, thereby lessening failure of the liner in the region of said junction of the conduit and the conduit flange under service conditions.

2. The conduit of claim 1 wherein the annular insert is radially split at one location.

3. The conduit of claim 1 wherein the annular insert is a synthetic resin.

4. The conduit of claim 1 wherein the curved surface of the annular insert has a radius of from about ¼ to three times the thickness of the thermoplastic lining.

* * * * *